July 11, 1967 E. BEYERLE 3,330,913

SIGNAL EVALUATION EQUIPMENT

Filed March 11, 1964

INVENTOR
ERNST BEYERLE

BY Phillips A. Weiss
ATTORNEY

United States Patent Office 3,330,913

Patented July 11, 1967

3,330,913
SIGNAL EVALUATION EQUIPMENT

Ernst Beyerle, Fellbach, Germany, assignor to International Standard Electric Corporation, New York, N.Y., a corporation of Delaware Filed Mar. 11, 1964, Ser. No. 350,967
Claims priority, application Germany, Apr. 6, 1963, St 20,480
7 Claims. (Cl. 179—84)

ABSTRACT OF THE DISCLOSURE

A voice frequency signal evaluating system designed to avoid double evaluation when the received signal is interrupted. The receiver uses a delay timer and an extension timer to cancel the interrupt time.

The invention relates in general to multi-frequency code receivers and more particularly to signal evaluation equipment for use with speech-immunity circuits used in such receivers.

In multi-frequency signalling methods, signals may erroneously be produced responsive to speech frequencies. A remedy against these hazards is to provide each receiver with a speech-immunity circuit which blocks the receiver when received voltages have frequencies that deviate from the signal frequency. Accordingly, when there are two signal frequency groups, the frequencies of one group are kept off the receivers of the other group and vise versa. Despite these speech-immunity circuits in the receivers, occasionally wrong signals may occur that are caused by speech-frequency effects. This disadvantage was eliminated in prior art circuits when the receiving devices were provided with a delay time. Therefore, it was necessary to increase the signal pulse width since a signal must have a predetermined minimum duration. Besides, a certain operation time of the receiver is necessary to obtain proper evaluation. Of course this increase in signal length causes a reduction in the signal-transmission velocity.

Another problem in such multi-frequency signalling methods is blocking of the receiver by interfering pulses which occur during a signal. This influence may lead to a double evaluation of a signal.

A co-pending patent application entitled V-F Key Dialling, Ser. No. 291,912 filed July 1, 1963 covering an invention of G. Vogel, now Patent No. 3,299,216 and assigned to the assignee of this invention relates to a multi-frequency code receiving system using speech-immunity receivers. In that system the output of a receiver or a combination of receivers is delayed for a time determined by a first timing circuit. The output signal of the receivers after the delay is maintained by a second timing circuit although all receivers participating in the signal are dropped. As described in the noted co-pending patent application, such receiving devices are operated for a short time by speech, or blocked for a short time due to interfering voltages during a signal.

The co-pending patent application covers an invention that increases the evaluation reliability in receiving devices with speech-immunity receivers by using two timing circuits. The first timing circuit presupposes a minimum signal duration and the second timing circuit effects the corresponding extension of the signal.

If the delay time of the second timing circuit is selected larger than the delay time of the first timing circuit, the circuit provides protection against interruptions during the receipt of a bona fide signal. The admissible interruption period is obtained by the difference of both delay times. If relatively large interruption periods are to be overcome, a very large delay time for the second timing circuit must be selected when the delay time of the first timing circuit is given. However, a drawback is that in order to avoid any reduction in the signalling velocity of the multi-frequency code device, the delay time of the second timing circuit must be within the range of the normal signal intervals.

Accordingly, an object of the invention is to provide new and unique signal evaluation equipment.

A more particular object of the invention is to provide signal evaluation equipment having at least two timing circuits actuated simultaneously. A first timing circuit for delaying the start of the signal to be evaluated and a second timing circuit for extending the on-time of the signal to be evaluated.

A related object of the invention is to provide signal evaluation equipment having at least two simultaneously actuated timing circuits that provide protection against interruptions occurring during the receipt of a bona fide signal without causing any reduction in signalling velocity.

A related feature of this invention is that the timing circuits switch-off independently.

According to one aspect of this invention the outputs of receivers equipped with speech-immunity circuits is fed through an individual OR gate to an individual AND gate. The output of the AND gates are connected to registers or evaluating circuitry. The other input to the AND gates is provided by two timing circuits, simultaneously actuated under the control of the received signal. The timing circuits are logically interconnected to switch off independently. The first timing circuit provides a starting delay; while, the second timing circuit provides a signal extension. The logical combination provides protection against long signal interruptions without sacrificing signalling velocity.

The above mentioned and other objects and features of the invention will become apparent and the invention will be best understood when the specification is read in conjunction with the accompanying drawings comprising FIGURES 1 and 2 in which.

Figure 1:
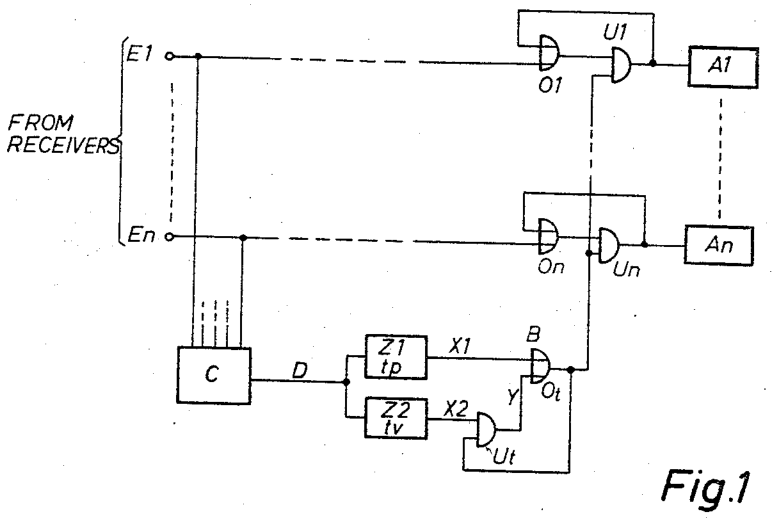
FIG. 1 shows the circuit diagram in principle of the multi-frequency code-receiving device according to the invention.

FIG. 1 shows the multi-frequency code-receiving device in block diagram form. The receivers E1 . . . E*n*, equipped with speech-immunity circuit, only render an output signal, if a genuine signal frequency combination is at hand. Depending on the code selected only one of the receivers or only a combination of receivers can emit an output signal. To check these output conditions an OR circuit or a code-checking device C is provided which is designed to be responsive to a certain code. Evaluation of the signal is initiated only if this supervising device at the output D indicates a genuine signal.

The output signals of the receivers participating at the particular signal are connected to the input of the successive OR circuits O1 . . . O*n* and also are connected through these OR circuits to the input of the AND circuit U1 . . . U*n*.

Figure 2:
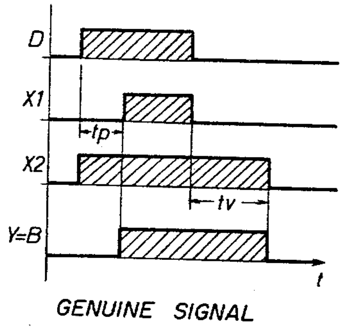
FIG. 2 shows the time ratios during evaluation of a genuine signal.

A protective time and an extension time is produced by the two timing circuits Z1 and Z2 respectively. As may be gathered from FIG. 2, the timing circuit Z1 emits an output signal X1 after a protective delay time *tp*, if it is operated from the output signal D of an OR circuit or of the code checking device C. The parallel timing circuit Z2 responds immediately and releases the evaluation through its output signal X2. The signal X2 reaches an input of AND circuits U*t*.

The output signal X1 of the first timing circuit Z1 is led to the input of an OR circuit O*t*. The output signal Y of the AND circuit U*t* is led to the other input of the OR circuit O*t*. The output of the OR circuit O*t* furnishes the evaluation signal B and is connected with the second input of the AND circuits U1 . . . U*n* and in addition, is connected to the second input of the AND circuit U*t*.

The delay time *tp* of the second timing circuit is selected, according to the invention, so that it is larger than the maximum period of any signal interruption, but smaller than the minimum signal interval.

In order to avoid any influence on the evaluation after the protecting period *tp* and the commencement of the signal X1 a further embodiment of the multi-frequency code receiving device according to the invention provides that during the evaluation period any effect of the receiver outputs on the evaluation facilities is prevented. This is achieved in the simplest manner in that the receiver output signals are led to the evaluation facilities over a multi-gate circuit, and that this gate circuit is controlled by the evaluation signal B. The signal checking at an interferred signal thereby requires that the code checking device is replaced by a single OR circuit with several inputs adapted to the number of the receivers when the evaluation signal occurs.

The operation of the invention will now be explained in greater detail. Depending on the code selected only one receiver or a combination of receivers can participate. The code checking device C performs the signal testing. The input signals E1 . . . E*n* are applied to the inputs of the AND circuits U1 . . . U*n* via the OR circuits O1 . . . O*n*. As long as no evaluation signal B appears over the timing circuit with Z1 and Z2 received signals do not effect the evaluation means A1 . . . A*n*.

When the signal D of the code testing device C is given for at least a period *tp* the timing circuit Z1 renders the output signal X1. (These time conditions and relations may be understood from FIG. 2.) Although the timing circuit Z2 already renders an output signal X2 the evaluation is still not initiated. The output signal X2 is blocked by the AND circuit U*t* until the output signal X1 appears.

When the output signal X1 occurs the evaluation of the signal at hand is initiated via the evaluation signal B. The AND circuits U1 . . . U*n* are operated and the evaluation switching means A1 . . . A*n* respond. Simultaneously, the signal conditions of the inputs E1 . . . E*n* are maintained via the feed-back paths to the OR circuits O1 . . . O*n*. Any spurious signal on the receiving end at this time has no effect because the inputs E1 . . . E*n* are led to the evaluation facilities via a multi-gate circuit and the gate circuit is blocked by the evaluation signal B.

When the code checking facility C furnishes no signal D the output signal X1 is immediately switched off by the timing circuit Z1, and the output signal X2 is switched off by the timing circuit Z2 after time *tv*. The feedback path from the output of the OR circuit O*t* to the input of the AND circuit U*t* thereby guarantees that the evaluation signal B is maintained until the output signal X2 has ceased. When the signal X2 has ceased all feedback paths are interrupted by the AND circuits U*t*, U1 . . . U*n* and the receiving facility is ready to receive a new signal.

Figure 3:
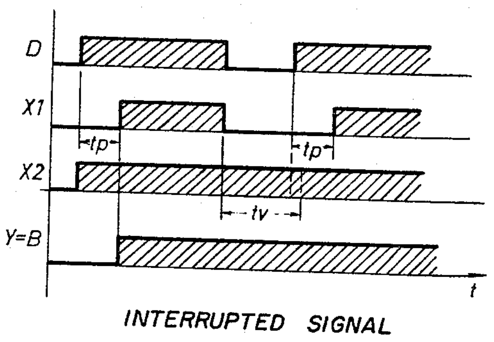
FIG. 3 shows the time ratios during evaluation of an interrupted signal.

FIG. 3 shows the condition during the reception of an interfered or interrupted signal. At the commencement of the signal the conditions are as described above. When the signal D of the code checking facility C is interrupted, the interruption also effects the timing circuit Z1 and is extended by the period *tp*. When the signal D however, reappears prior to the rundown of the time *tv* of the timing circuit Z2, the signals Y and B are not interrupted. Therefrom it is clearly shown that the time of the admissiable interruption is determined by the period *tv* of the second timing circuit, completely independent of the time *tp*.

While the principles of the invention have been described above in connection with specific apparatus and applications, it is to be understood that this description is made only by way of example and not as a limitation on the scope of the invention.

I claim:

1. A multi-frequency code receiving system having a plurality of receivers equipped with speech immunity circuits, first OR gate means actuated responsive to a signal received by any of said receivers, a first timing means operated responsive to a signal received from said first OR gate means to delay the start of said received signal, second timing means operated responsive to said received signal to extend the length of said signal, logic circuit means for combining the outputs of said first and said second timing means to produce an evaluation signal, evaluation means comprising a register associated with each of said receivers, control means operated responsive to a coincidence of signals from said receivers and said evaluation signal for controlling the input of signals of into said registers.

2. In the multi-frequency code receiving system of claim 1 wherein said first OR gate means comprises a circuit responsive to the receipt of signals from combinations of said receivers.

3. In the multi-frequency code receiving system of claim 1 wherein said logic circuit means comprises timing AND gate means and timing OR gate means, means connecting the output of said timing AND gate means to said timing OR gate means, said timing AND gate means operated responsive to a coincidence of signals from said timing OR gate means and said second timing means, and said timing OR gate means operated to produce said evaluation signal responsive to a signal from said first timing means or from said timing AND gate means.

4. In the multi-frequency code receiving system of claim 3 wherein said control means comprises receiver OR gates individually associated with each of said receivers, receiver AND gate means individually associated with each of said receiver OR gates operated responsive to a coincidence of signals received from said receiver OR gates and from said timing OR gate means, means for connecting the output of said receiver AND gates to the input of said individually associated receiver OR gates, respectively and means responsive to the operation of said individual receive AND gates for registering signals into said associated register.

5. A multi-frequency code receiving system having a plurality of receivers equipped with speech immunity circuits, evaluation means for registering received signals, first timing means for delaying the transmission of said received signals from said receivers to said evaluation means, second timing means for controlling the switch-off of said received signal transmission to said evaluation means by extending the time span of said received signal, means for connecting said first and said second timing means in parallel, check means connected to said receivers for controlling said timing means, and logic means for making said switch-off independent of said first timing means.

6. In the multi-frequency code receiving system of claim 5 wherein said logic means comprises timing OR circuit means connected to the output of said first timing means, timing AND circuit means connected to the output of said second timing means, control means for connecting the output of said timing OR circuit means to control the transmission of said received signals to said evaluating means, means for connecting the output of said timing OR circuit means to the input of said timing AND circuit means whereby said timing AND circuit means operates responsive to a coincidence of signals received from said timing OR circuit means and said second timing circuit means, and said timing OR circuit means operates responsive to either a signal from said first timing circuit means or said timing AND circuit means.

7. In the multi-frequency code receiving system of claim 6 wherein said extension of time provided by said second timing circuit means is larger than any received signal interruption and smaller than the minimum received signal interval.

References Cited

UNITED STATES PATENTS 3,128,349 4/1964 Boesch et al. ---------- 179—84

H. ZELLER, *Assistant Examiner.*

KATHLEEN H. CLAFFY, *Primary Examiner.*